US012780560B2

(12) United States Patent
Olson et al.

(10) Patent No.: US 12,780,560 B2
(45) Date of Patent: Nov. 3, 2026

(54) CONVEYOR SCRAPER SYSTEMS, METHODS AND APPARATUS

(71) Applicant: Superior Industries, Inc., Morris, MN (US)

(72) Inventors: Kent Olson, Morris, MN (US); Paul Schmidgall, Morris, MN (US)

(73) Assignee: Superior Industries, Inc., Morris, MN (US)

( * ) Notice: Subject to any disclaimer, the term of this patent is extended or adjusted under 35 U.S.C. 154(b) by 37 days.

(21) Appl. No.: 18/888,831

(22) Filed: Sep. 18, 2024

(65) Prior Publication Data

US 2025/0011101 A1 Jan. 9, 2025

Related U.S. Application Data

(63) Continuation of application No. 18/063,924, filed on Dec. 9, 2022, now Pat. No. 12,129,129.

(60) Provisional application No. 63/364,016, filed on May 2, 2022, provisional application No. 63/287,882, filed on Dec. 9, 2021.

(51) Int. Cl.
*B65G 45/16* (2006.01)
*B65G 45/02* (2006.01)

(52) U.S. Cl.
CPC .................................... *B65G 45/16* (2013.01)

(58) Field of Classification Search
CPC ................................ B65G 45/12; B65G 45/16
USPC ......................................... 198/497, 498, 499
See application file for complete search history.

(56) References Cited

U.S. PATENT DOCUMENTS

| | | | | |
|---|---|---|---|---|
| 607,656 A | | 7/1898 | Dixon | |
| 3,598,231 A | | 8/1971 | Matson | |
| 3,722,667 A | | 3/1973 | Olson | |
| 3,782,534 A | | 1/1974 | Holleman | |
| 4,189,046 A | | 2/1980 | Ward et al. | |
| 4,202,437 A | | 5/1980 | Gordon | |
| 4,269,301 A | | 5/1981 | Gibbs | |
| 4,402,394 A | | 9/1983 | Stoll | |
| 4,529,084 A | * | 7/1985 | Zhang | B65G 45/16 198/499 |
| 4,533,036 A | | 8/1985 | Gordon | |
| 4,586,600 A | * | 5/1986 | Lindbeck | B65G 45/16 198/499 |
| 4,694,952 A | * | 9/1987 | Meijer | B65G 45/12 15/256.5 |
| 4,768,645 A | | 9/1988 | Farris | |
| 4,779,119 A | | 10/1988 | Kaieda | |
| 4,795,024 A | | 1/1989 | Eatwell | |

(Continued)

FOREIGN PATENT DOCUMENTS

| | | |
|---|---|---|
| DE | 29719469 U1 | 1/1999 |
| DE | 19748070 B4 | 3/2004 |

(Continued)

OTHER PUBLICATIONS

US 2006/0049023 A1, Dietsch et al., Mar. 9, 2006.*

(Continued)

*Primary Examiner* — Douglas A Hess
(74) *Attorney, Agent, or Firm* — Todd R. Fronek; Larkin Hoffman Daly & Lindgren, Ltd.

(57) ABSTRACT

Systems, methods and apparatus are provided for scraping material from a conveyor belt. Some embodiments include primary and secondary scraper assemblies.

11 Claims, 9 Drawing Sheets

(56) References Cited

U.S. PATENT DOCUMENTS

| | | | | |
|---|---|---|---|---|
| 4,836,356 | A | 6/1989 | Mukai et al. | |
| 4,850,474 | A | 7/1989 | Schwarze | |
| 4,936,439 | A | 6/1990 | Alexander, Jr. et al. | |
| 4,953,689 | A | 9/1990 | Peterson et al. | |
| 4,969,553 | A | 11/1990 | Stoll | |
| 5,016,746 | A | 5/1991 | Gibbs | |
| 5,149,305 | A | 9/1992 | Gordon | |
| 5,197,587 | A | 3/1993 | Malmberg | |
| 5,222,589 | A | 6/1993 | Gordon | |
| 5,241,350 | A | 8/1993 | Biegelow | |
| 5,301,797 | A | 4/1994 | Hollyfield, Jr. et al. | |
| D347,918 | S | 6/1994 | Gibbs | |
| 5,385,507 | A | 1/1995 | Swearingen et al. | |
| 5,518,107 | A * | 5/1996 | Schwarze | B65G 45/16 198/499 |
| 5,865,997 | A | 2/1999 | Isaacs | |
| 5,887,702 | A | 3/1999 | Mott | |
| 5,944,167 | A | 8/1999 | Brink | |
| 5,950,803 | A | 9/1999 | Schwarze | |
| 5,979,638 | A | 11/1999 | Wiggins | |
| 5,992,614 | A | 11/1999 | Mott | |
| 6,056,112 | A | 5/2000 | Wiggins | |
| 6,182,816 | B1 | 2/2001 | Gibbs et al. | |
| 6,213,287 | B1 | 4/2001 | Juracko | |
| 6,283,274 | B1 | 9/2001 | Dolan et al. | |
| 6,315,105 | B1 | 11/2001 | Gibbs et al. | |
| 6,354,428 | B1 | 3/2002 | Gibbs et al. | |
| 6,374,991 | B1 | 4/2002 | Swinderman | |
| 6,439,373 | B1 | 8/2002 | Swinderman | |
| 6,443,294 | B1 | 9/2002 | Brody et al. | |
| 6,457,575 | B2 | 10/2002 | Swinderman | |
| 6,575,292 | B2 | 6/2003 | Swinderman | |
| D482,508 | S | 11/2003 | DeVries | |
| 6,746,575 | B1 * | 6/2004 | Juvakka | D21G 3/005 15/256.51 |
| 6,820,734 | B1 | 11/2004 | Gilbert et al. | |
| 6,860,378 | B1 * | 3/2005 | Johannsen | B65G 45/16 198/497 |
| 6,948,609 | B2 | 9/2005 | Finger et al. | |
| 7,007,794 | B2 | 3/2006 | Waters et al. | |
| D524,009 | S | 6/2006 | Smith et al. | |
| 7,216,756 | B2 | 5/2007 | Swinderman | |
| 7,240,393 | B2 * | 7/2007 | Shyu | G03G 21/0029 118/104 |
| 7,308,980 | B2 | 12/2007 | Peterson et al. | |
| 7,383,940 | B1 | 6/2008 | Stumpf, Jr. et al. | |
| 7,441,647 | B2 | 10/2008 | Wiggins et al. | |
| D594,623 | S | 6/2009 | Felton | |
| 7,549,532 | B2 | 6/2009 | Ostman | |
| 7,819,237 | B2 | 10/2010 | Felton | |
| 8,028,819 | B1 | 10/2011 | Swinderman | |
| 8,123,022 | B2 | 2/2012 | Mott et al. | |
| 8,393,459 | B2 | 3/2013 | Childs et al. | |
| 8,485,344 | B1 | 7/2013 | Liland | |
| 8,776,990 | B2 * | 7/2014 | Felton | B65G 45/16 198/499 |
| D740,514 | S | 10/2015 | Peterson et al. | |
| D756,060 | S | 5/2016 | DeVries | |
| 9,731,906 | B2 * | 8/2017 | Strathaus | B65G 45/16 |
| 9,738,456 | B1 | 8/2017 | Grimm et al. | |
| 10,351,351 | B2 * | 7/2019 | Schulte Strathaus | B65G 45/16 |
| 11,897,700 | B2 * | 2/2024 | Collier | B65G 45/12 |
| 2003/0066737 | A1 | 4/2003 | Malmberg | |
| 2003/0230466 | A1 | 12/2003 | Swinderman et al. | |
| 2004/0188224 | A1 | 9/2004 | Kolodziej et al. | |
| 2006/0021854 | A1 | 2/2006 | Waters et al. | |
| 2006/0049023 | A1 | 3/2006 | Dietsch et al. | |
| 2006/0131135 | A1 | 6/2006 | Waters et al. | |
| 2007/0089968 | A1 | 4/2007 | Swinderman | |
| 2010/0126832 | A1 | 5/2010 | DeVries | |
| 2011/0067197 | A1 | 3/2011 | Mott et al. | |
| 2015/0274434 | A1 | 10/2015 | DeVries | |
| 2016/0052723 | A1 | 2/2016 | Peterson et al. | |
| 2016/0152417 | A1 | 6/2016 | Rolfsson et al. | |
| 2018/0222687 | A1 | 8/2018 | Christian | |

FOREIGN PATENT DOCUMENTS

| | | | |
|---|---|---|---|
| WO | 2003053823 | A1 | 7/2003 |
| WO | 2015024607 | A1 | 2/2015 |
| WO | 2016116940 | A1 | 7/2016 |

OTHER PUBLICATIONS

Martin Engineering, “Martin QC1 Cleaner XHD Operator’s Manual”, 2015 (24 pages).

Superior Industries, “Exterra Belt Cleaners”, Brochure, Dec. 2015 (4 pages).

Martin Engineering, “Martin Twist Tensioner Operator’s Manual”, 2015 (28 pages).

Arch Enviornmental Equipment, Inc. “Super Saber Primary Cleaner”, Brochure (2 pages), published more than one year before application priority date.

Argonics Inc., “Installation Guide, S3MAX, Conveyor Belt Cleaning System”, (12 pages), published more than one year before application priority date.

Argonics Inc., “Super Eraser HD, Primary Conveyor Belt Cleaning System”, Brochure (2 pages), published more than one year before application priority date.

Argonics Inc.: Polyurethane Products, (http://www.conveyorcare.com/argonics.html), retrieved Nov. 23, 2016, (2 pages).

ASGCO Manufacturing Inc., “Super Skalper IV”, Brochure, Jun. 2012 (2 pages).

Brelko Conveyor Products, “Installation, Operating & Maintenance Manual—E901 Head Pulley Belt Scraper”, Version 6.Jul. 4, 2015 (18 pages).

Brelko Conveyor Products, “Installation, Operating & Maintenance Manual—E101 Primary Belt Scraper”, Version 6.Jul. 4, 2015 (22 pages).

Flexco, “Belt Cleaner Component Comparisons”, Brochure, 2007 (6 pages).

Flexco, “EZP1T, Standard-Duty Precleaner”, Brochure, 2015 (2 pages).

Flexco, “MHCP, Heavy-Duty Cartridge Precleaner”, Brochure, 2015 (2 pages).

* cited by examiner

CONVEYOR SCRAPER SYSTEMS, METHODS AND APPARATUS

BACKGROUND

Conveyor scrapers are used to remove material from conveyor belts.

DESCRIPTION

Figure 1:
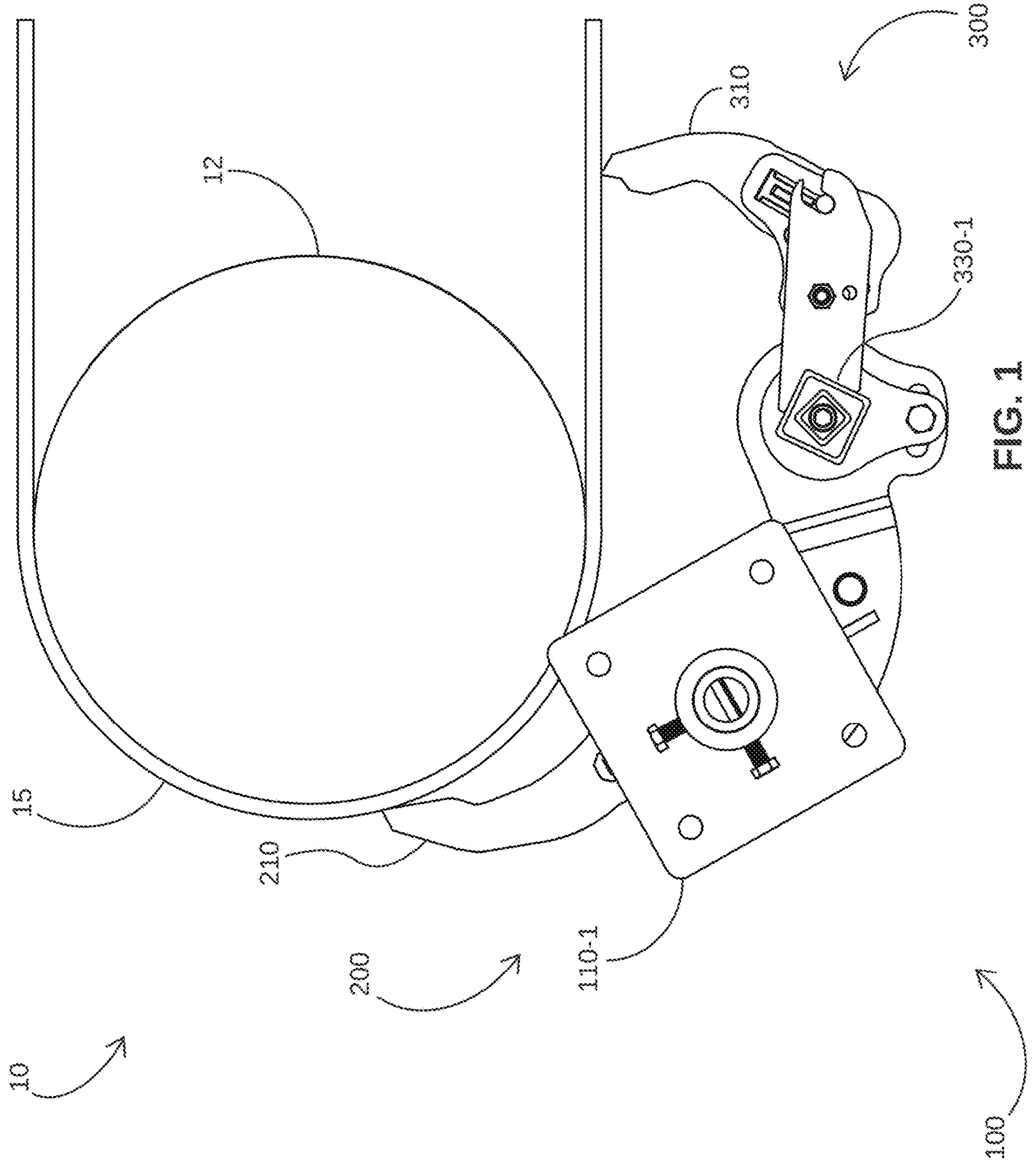
FIG. 1 is a side elevation view of an embodiment of a conveyor scraper operably coupled to an embodiment of a conveyor.
Figure 2:
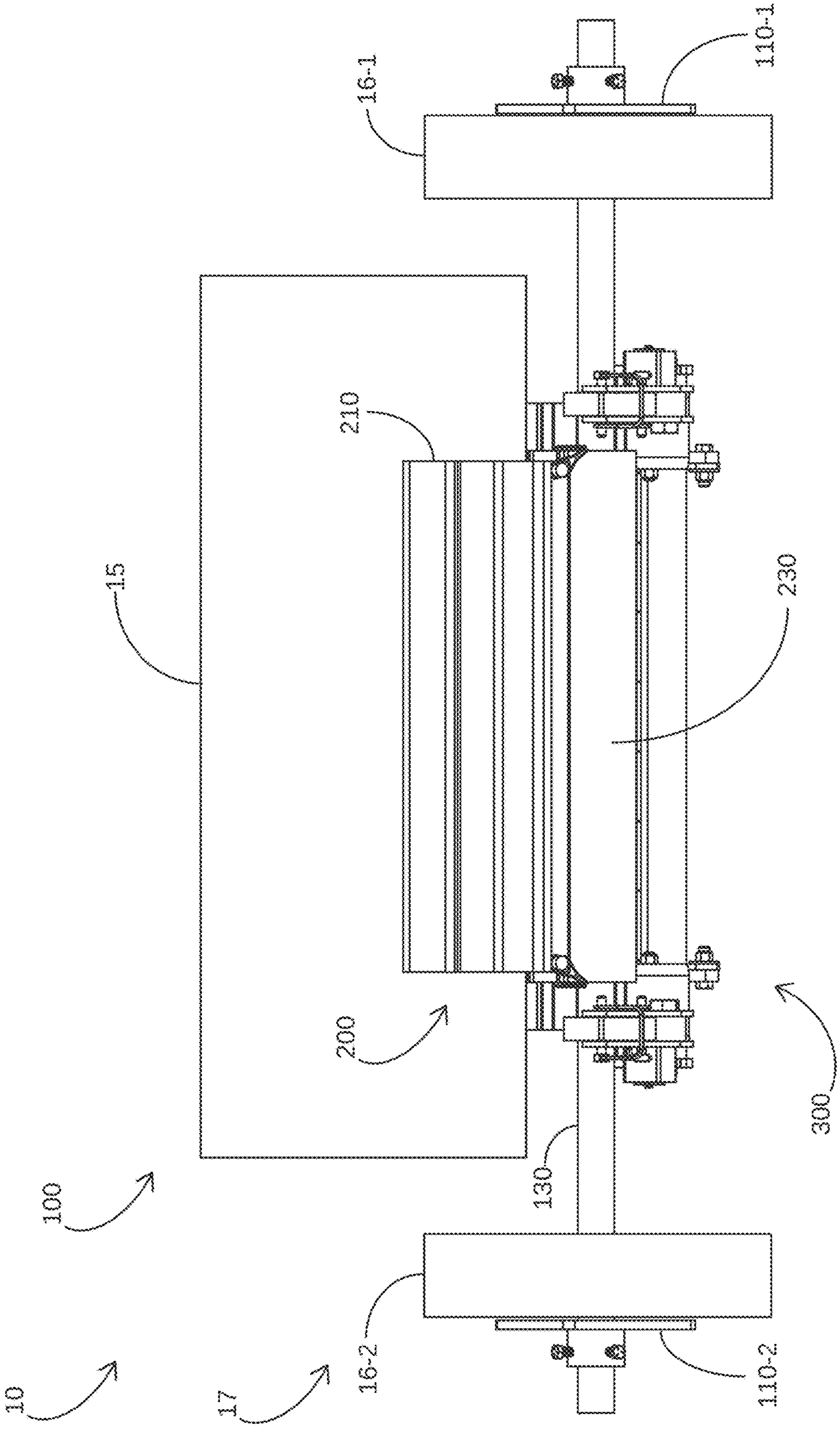
FIG. 2 is a front elevation view of the conveyor scraper of FIG. 1 coupled to the conveyor of FIG. 1.
Figure 3:
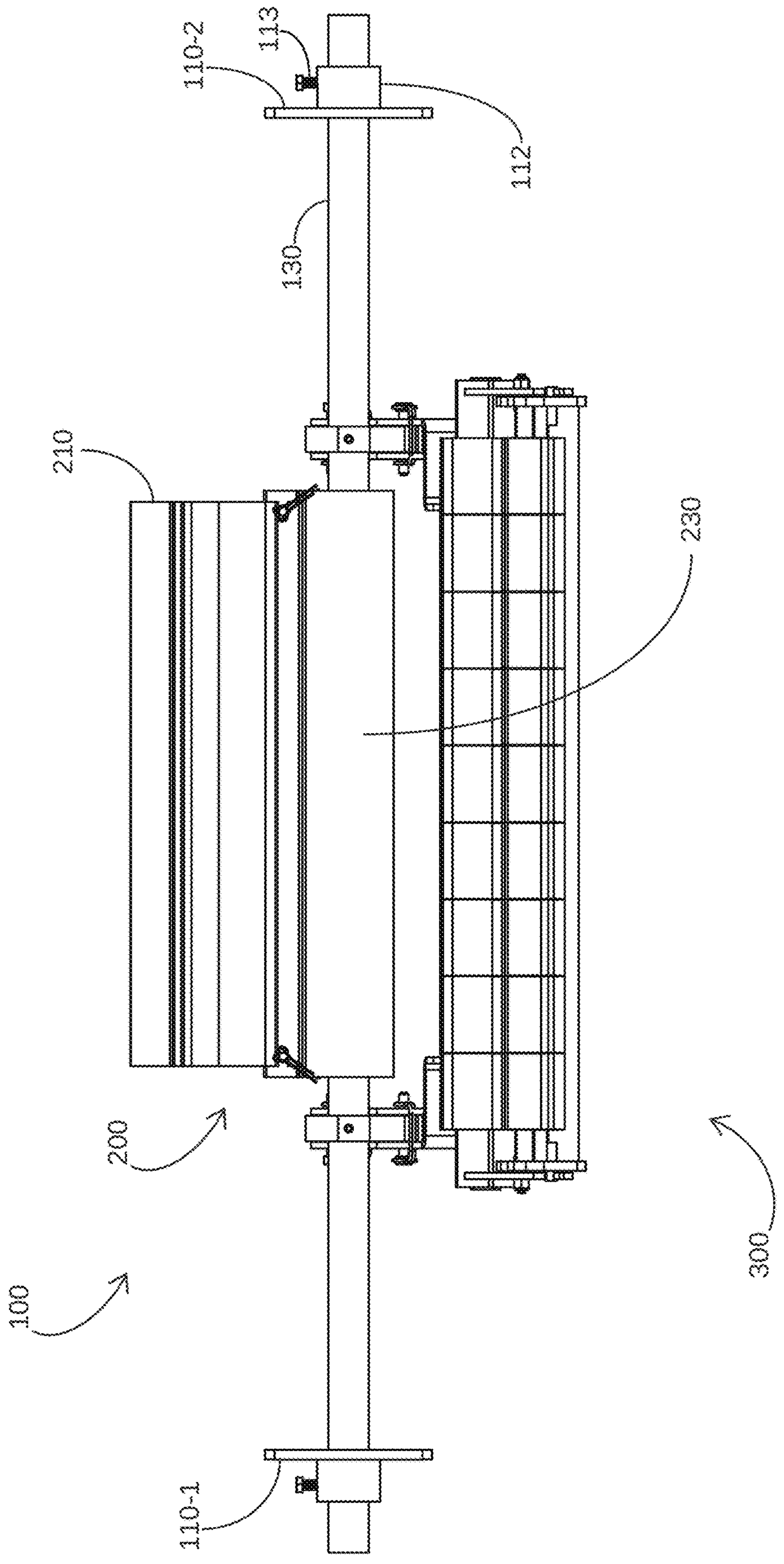
FIG. 3 is a rear elevation view of the conveyor scraper of FIG. 1.

Referring to the drawings, wherein like reference numerals designate identical or corresponding parts throughout the several views, FIGS. 1-3 illustrate an embodiment of a conveyor 10 comprising an endless belt 15 operably supported (e.g., at a head end of the conveyor, etc.) by a pulley 12 (e.g., a head pulley, etc.). The pulley 12 is operably supported on a conveyor truss 17 (e.g., a head end of a truss, a head end of a stinger truss in telescoping conveyor embodiments, etc.) comprising side members 16-1, 16-2.

Continuing to refer to FIGS. 1-3, an embodiment of a conveyor scraper 100 is illustrated operably supported on the conveyor 10. The conveyor scraper 100 is optionally supported on the side members 16-1, 16-2. For example, in some embodiments the conveyor scraper 100 comprises a transversely extending pole 130 which is supported on respective mounting plates 110-1, 110-2 of the scraper 100. The pole 130 is optionally at least partially received in a collar 112 which is in turn mounted to (e.g., welded to, etc.) an associated mounting plate 110. The pole 130 is optionally prevented from rotation by one or more fasteners 113 (e.g., set screws, bolts, etc.) which extend at least partially through the collar 112. Each of the mounting plates 110-1, 110-2 is optionally mounted (e.g., by bolts or other fasteners) to a respective side member 16-1, 16-2. The scraper 100 optionally includes a primary scraper blade assembly 200 (e.g., pivotally coupled to the pole 130, etc.) comprising a primary scraper blade 210 configured to contact (e.g., engage, resiliently engage, resiliently contact, etc.) a first operating location of the belt 15 as the belt moves past the first operating location. The first operating location of the belt is optionally a location adjacent to the pulley 12 such that pressure applied by blade 210 is at least partially resisted by the pulley 12. The scraper 100 optionally includes a secondary scraper blade assembly 300 (e.g., pivotally coupled to the pole 130, etc.) comprising a secondary scraper blade

310 which is optionally configured to contact (e.g., engage, resiliently engage, resiliently contact, etc.) the belt 15 at a second operating location (e.g., a return side, lower side, underside, etc.) of the belt 15 as the belt 15 moves past the second operating location.

Continuing to refer to FIGS. 1-3, the primary scraper blade 210 is optionally resiliently biased (e.g., by one or more springs, etc.) into contact with the belt 15. The secondary scraper blade 310 is optionally resiliently biased (e.g., by one or more springs, etc.) into contact with the belt 15.

Figure 4:
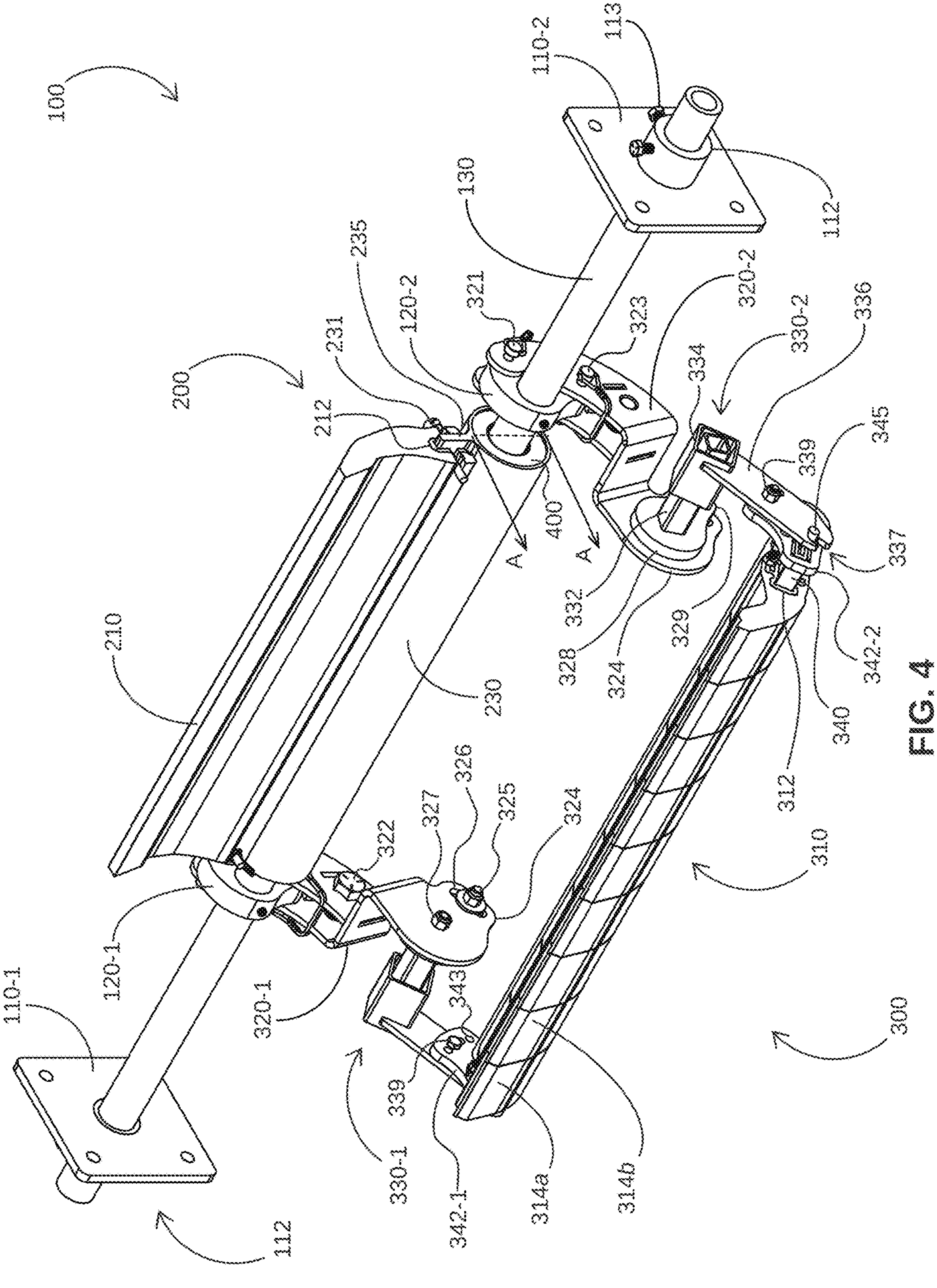
FIG. 4 is a perspective view of the conveyor scraper of FIG. 1.

Referring to FIG. 4, primary scraper blade assembly 200 of the conveyor scraper 100 is described in more detail as follows. The scraper blade assembly 200 (e.g., one or more bearing assemblies 400 thereof, etc.) is optionally pivotally supported on the pole 130. A housing 230 is optionally supported (e.g., pivotally supported, etc.) on the pole 130 (e.g., by being attached on one or more bearing assemblies 400 supported on the pole 130). The blade 210 (which in various embodiments is made of urethane, plastic, polymer, etc.) optionally includes (e.g., is overmolded onto, etc.) a transversely extending base 212 (which in some embodiments is made of metal or another material). The base 212 is optionally mounted to a transversely extending support 235 of the housing 230, e.g., by inserting the support 235 into the base 212 and/or inserting one or more pins 231 through the support 235 and the base 212 and/or the blade 210).

Figure 5:
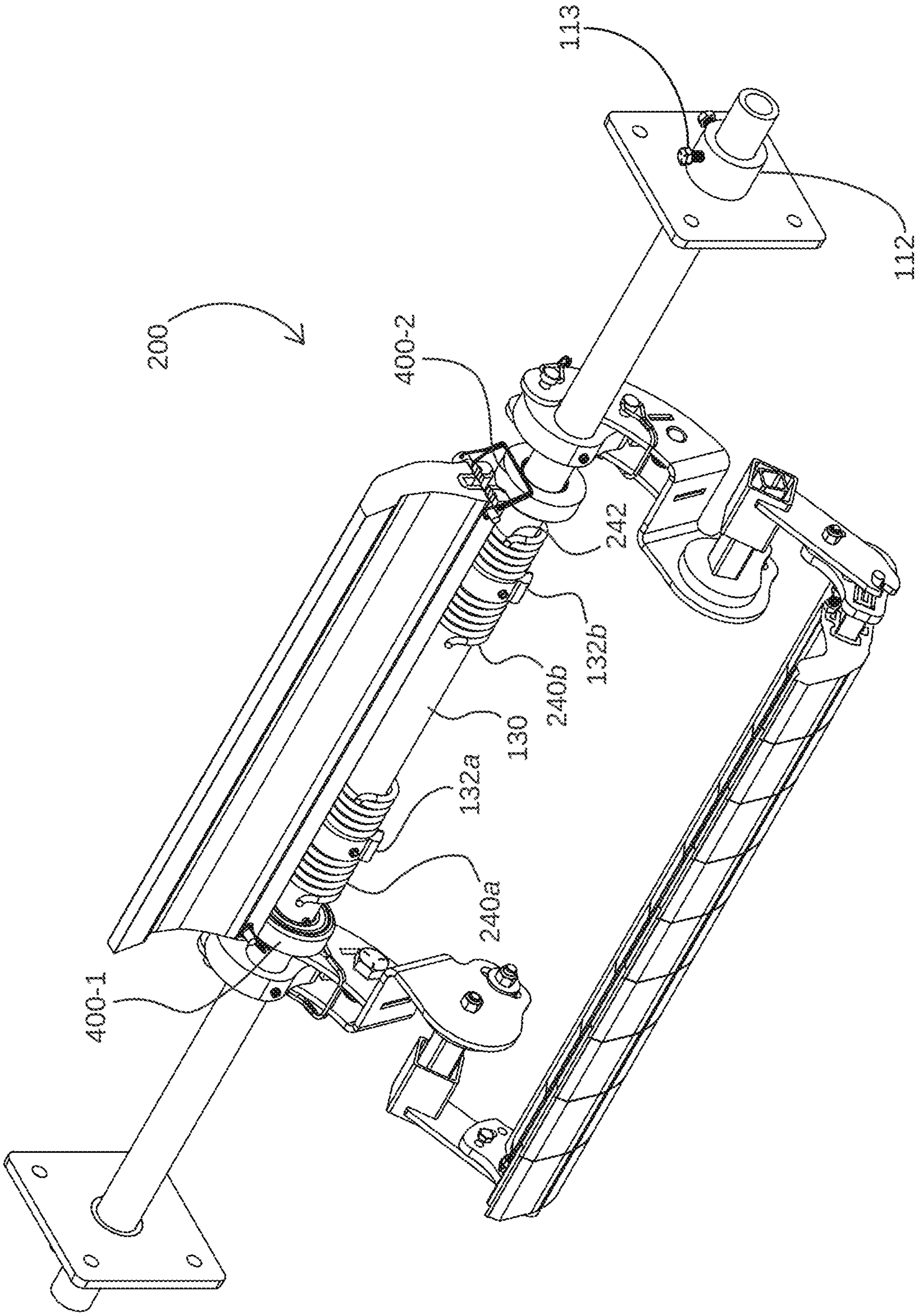
FIG. 5 is a perspective view of the conveyor scraper of FIG. 1 with a housing not shown in order to better illustrate components inside the housing.

Referring to FIG. 5, in which the housing 230 is not shown, bearing assemblies 400-1, 400-2 are optionally disposed at least partially (e.g., partially, substantially, completely, etc.) inside the housing 230. One or more springs 240 (e.g., two springs 240*a* and 240*b*) are optionally disposed on (e.g., wrapped around, etc.) pole 130 to apply a torque to the blade 210. One or more of the springs are optionally at least partially enclosed inside housing 230 and arranged around pole 130. The springs 240 optionally comprise torsion springs, coil springs, etc. In some embodiments, a catch 132 associated with one or more springs 240 prevents the associated spring 240 from rotating in at least a first rotational direction about the pole 130. In some embodiments the catch 132 is mounted to and/or formed as a part with the pole 130, etc. In some embodiments a first catch 132*a* is associated with and engages a first spring 240*a*. In some embodiments a second catch 132*b* is associated with and engages a second spring 240*b*.

Figure 6:
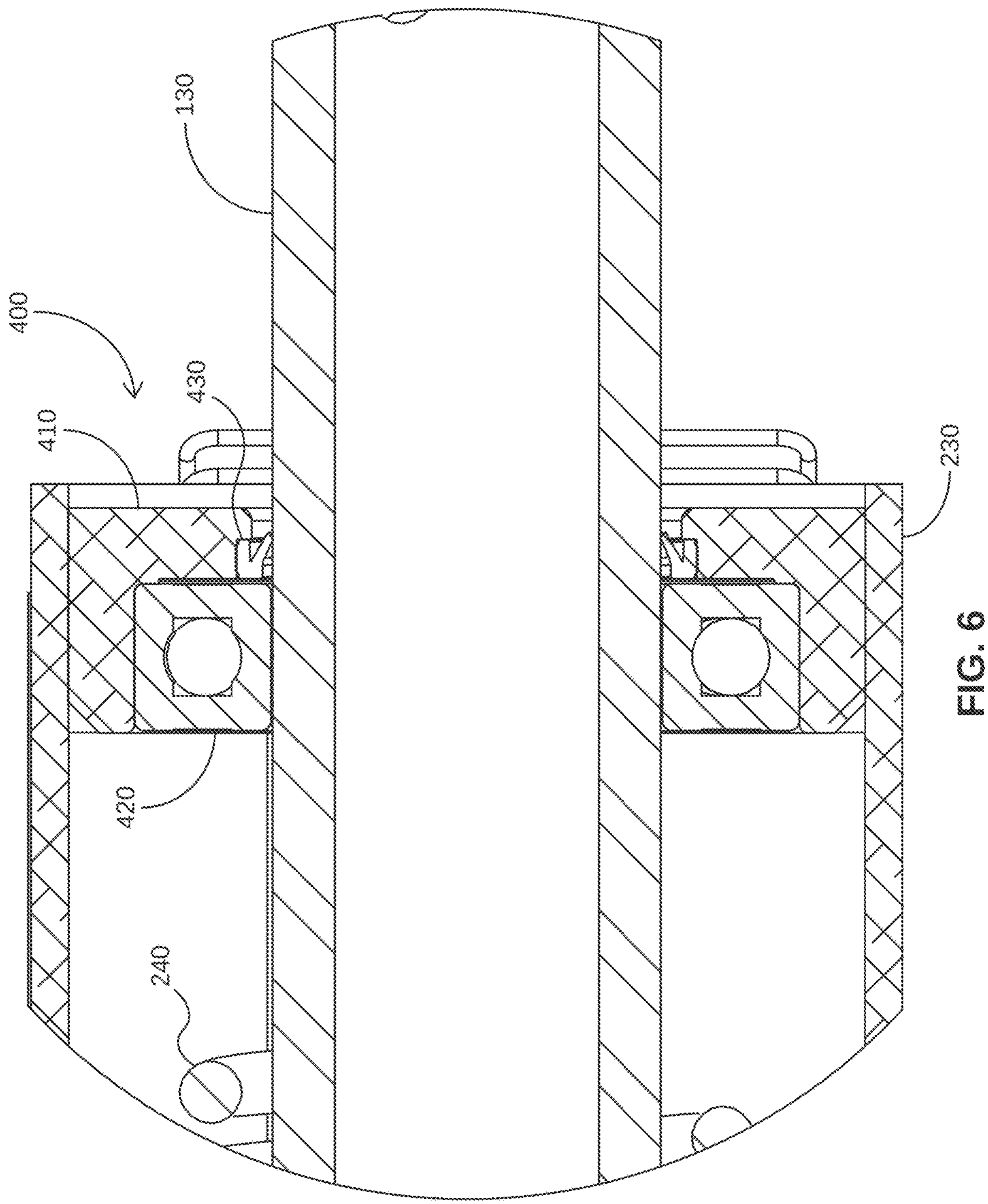
FIG. 6 is a cross-sectional view along the section A-A of FIG. 4.

Referring to FIG. 6, the bearing assembly 400 is illustrated in more detail. The bearing assembly 400 optionally comprises one or more of an annular bearing housing 410, annular seal 430, and bearing 420 (e.g., ball bearing, etc.). The bearing housing 410 is optionally positioned at an outboard end of the housing 230. The bearing housing 410 is optionally press fit or otherwise removably fixed (e.g., by screw threads, etc.) within the housing 230. The bearing 420 is optionally at least partially received (e.g., press fit, etc.) within the bearing housing 410. The pole 130 is optionally at least partially received (e.g., press fit, etc.) within the bearing 420. The bearing housing 410 optionally rotates (e.g., about a central axis of the pole 130) with an outer portion of the bearing 420. An inner portion of the bearing 420 optionally rotates (e.g., about a central axis of the pole 130) with the pole 130. The seal 430 is optionally at least partially received (e.g., press fit, etc.) within an opening in the bearing housing 410. The seal optionally resiliently engages an annular region of the pole 130 so as to form a seal preventing at least some material (e.g., debris, water, dust, etc.) from entering the bearing 420 and/or interior of housing 230 from outside the housing 230.

Figure 7:
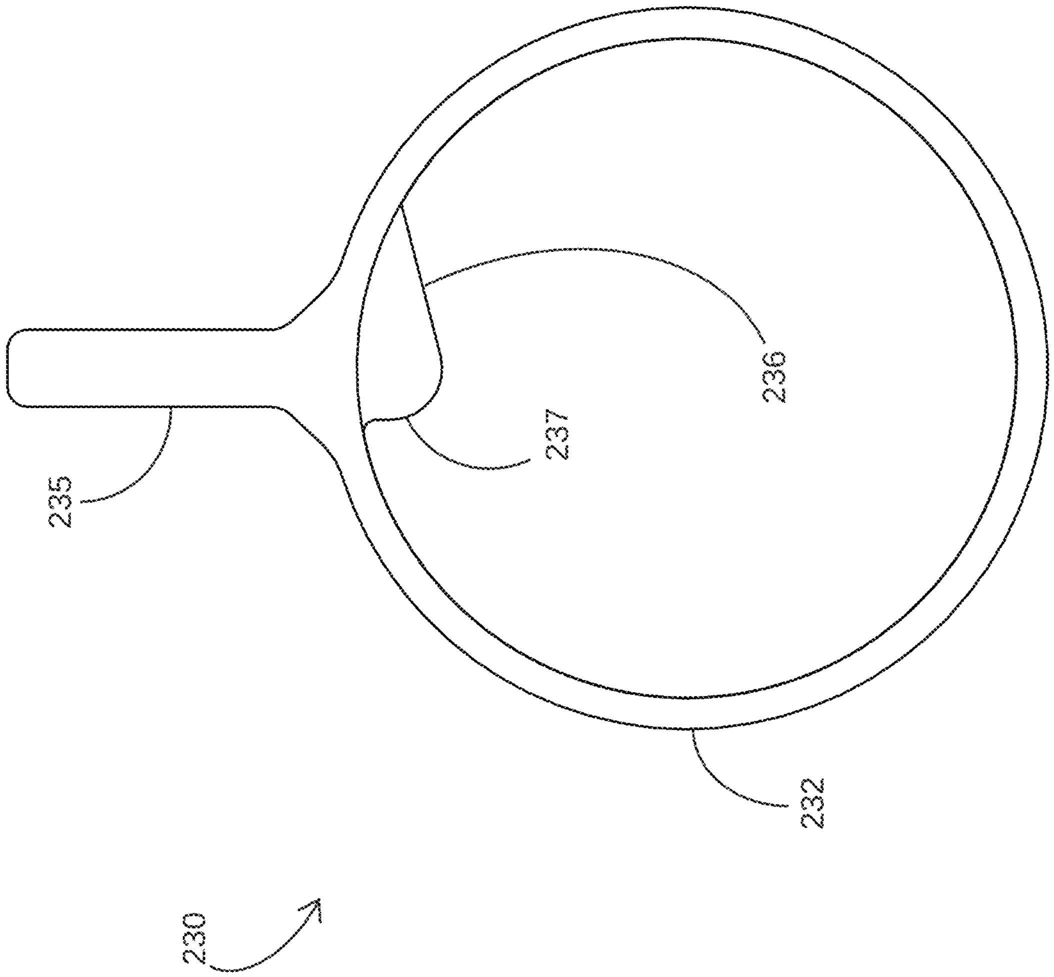
FIG. 7 is a side elevation view of an embodiment of a housing.

Referring to FIG. 7, the housing 230 is shown in more detail. In one embodiment, housing 230 is formed of an extrusion and optionally comprises one or more of a generally cylindrical body 232, a support 235, and an internal stop 236 optionally having a stop face 237. The support 235 is optionally fixed to (e.g., formed as a part with, welded to, attached to, mounted to, etc.) the body 232, e.g., an outer surface thereof. The stop 236 is optionally fixed to (e.g., formed as a part with, welded to, attached to, mounted to, etc.) the body 232, e.g., an inner surface thereof. In operation, a portion of each spring 240 (e.g., an end 242 of the spring 240) optionally contacts the stop 236 (e.g., the stop face 237) such that movement of the housing in a first rotational direction about the pole 130 increases the tension in the spring 240 and increases a force applied by the spring 240 to the housing 230.

Referring to FIG. 4, the secondary scraper blade assembly 300 is described in more detail. The secondary scraper blade assembly 300 optionally comprises first and second brackets 320-1, 320-2, respectively. Brackets 320-1, 320-2 are optionally coupled to associated arm mounts 120-1, 120-2, respectively. The arm mounts 120, and by extension the secondary scraper blade assembly 300, are optionally removably or releasably coupled (e.g., attached, fastened, mounted, etc.) to the pole 130. Each bracket 320 is optionally coupled to the associated arm mount 120 by a first pin 321 and/or a second pin 323. In some installation methods, the brackets 320 are first pinned to the arm mounts 120 by first pins 321 and then pivoted into position for installation of second pins 323.

Referring to FIG. 4, each bracket 320 optionally comprises a plate 324 which is optionally pivotally coupled (e.g., by a pivot 327 which may comprise a nut-bolt assembly or other fastener) to a pivot plate 328. A portion 329 (e.g., lower portion) of pivot plate 328 is optionally selectively mountable (e.g., by fastener 325) to one of a plurality of locations on plate 324 to select a rotational position of the pivot plate 328 relative to the plate 324. In some embodiments, fastener 325 is selectively inserted in one of a plurality of openings 326 (or one of a plurality of positions within an arcuate slot) provided in plate 324 in order to modify the rotational position and the fastener 325 is tightened in order to modify the pivotal position.

Referring to FIG. 4, each bracket 320 and/or each pivot plate 328 is optionally mounted to a first portion 332 (e.g., inner portion) of a torsional coupler 330 e.g., a torsional coupler such as those available from Rosta AG in Hunzenschwil, Switzerland). A second portion 334 of the torsional coupler 330 is optionally mounted (e.g., welded, etc.) to a mounting arm 336. The mounting arm 336 optionally supports and is optionally mounted (e.g., removably mounted) to an end of a secondary blade cross support 340. In some embodiments, a pin 345 operably coupled to the support 340 is inserted in a slot 337 in the mounting arm 336. In some installation methods, the pins 345 of cross support 340 are inserted in slots 337 and the support 340 is then pivoted about pins 345 to a desired pivotal position. First and second side plates 342-1, 342-2 are optionally mounted to first and second ends, respectively, of the cross support 340. A fastener 339 optionally removably couples the mounting arm 336 to one of a plurality of openings 343 in each side plate 342. The selected opening 343 optionally corresponds to a desired pivotal position of the support 340 and blade 310. The support 340 optionally supports a blade base 312 along the width thereof. The base 312 may be made of polymer, metal, or other suitable material. The blade 310 optionally comprises a plurality of blade segments 314 supported on blade base 312. In some embodiments the blade 310 (and/or segments 314 thereof) is attached to the blade base 312 by sliding attachment, one or more pins or other fasteners, etc. In some embodiments, the blade 310 is overmolded onto the base 312.

Referring to FIGS. 1 and 4, a method of tensioning an embodiment of the scraper 100 is described. The pole 130 is optionally rotated (e.g., clockwise on the view of FIG. 1) from a first rotational position to a second rotational position by a rotational extent (such as 60 degrees, about 60 degrees, between 30 and 90 degrees, etc.) (e.g., using a tool such as a wrench, etc.) such that the tension of one or more springs 240 is increased, increasing the resilient force applied by blade 210 on the belt 15. The pole 130 is optionally selectively secured in the second rotational position (e.g., by tightening one or more fasteners 113).

In some embodiments, a secondary scraper blade assembly 300 is selectively attachable to pole 130 prior to or after installation of pole 130 on the conveyor. In some embodiments the arm mounts 120 are coupled to pole 130 after installation of pole 130 on the conveyor. The brackets 320 are optionally pivotally coupled to the pole 130 such as by being pivotally coupled to arm mounts 120, e.g., using pin 321. The assembly 300 is then optionally pivoted (e.g., counter-clockwise on the view of FIG. 1) to an installation position. In the installation position each bracket 320 is optionally coupled (e.g., using pin 323) to the associated arm mount 120. Pivoting the assembly 300 into the installation position optionally places the blade 310 in contact with belt 15 and applies a torsion to torsional coupler 330. One of a plurality of the openings 326 is optionally selected in order to ensure contact between blade 310 and belt 15 and/or to achieve a desired or selected tension in the torsional coupler 330. One of a plurality of the openings 343 is optionally selected in order to adjust an angle (which may be referred to as an "attack angle") between blade 310 and belt 15.

Figure 8:
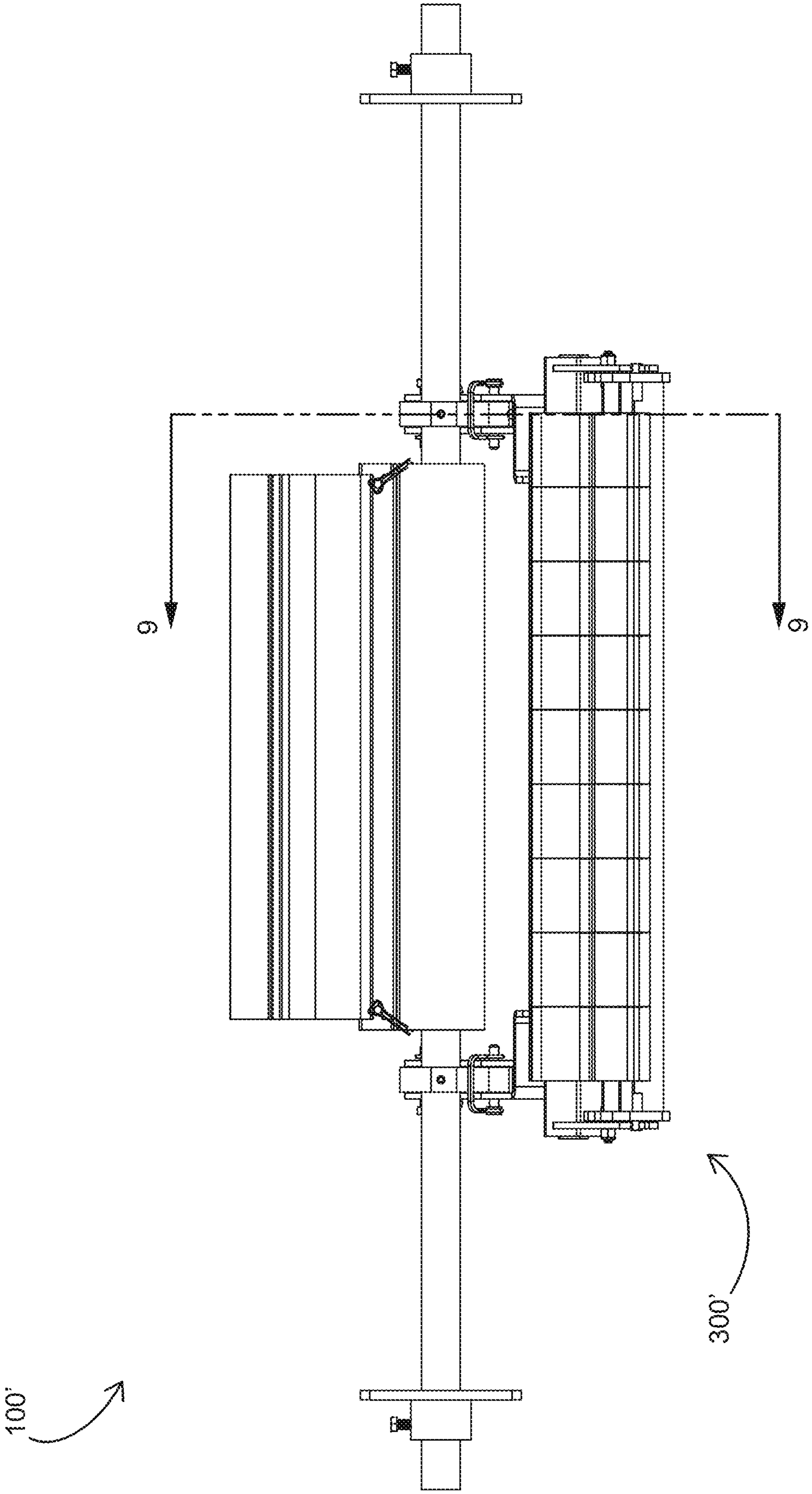
FIG. 8 is a side elevation view of another embodiment of a conveyor scraper.
Figure 9:
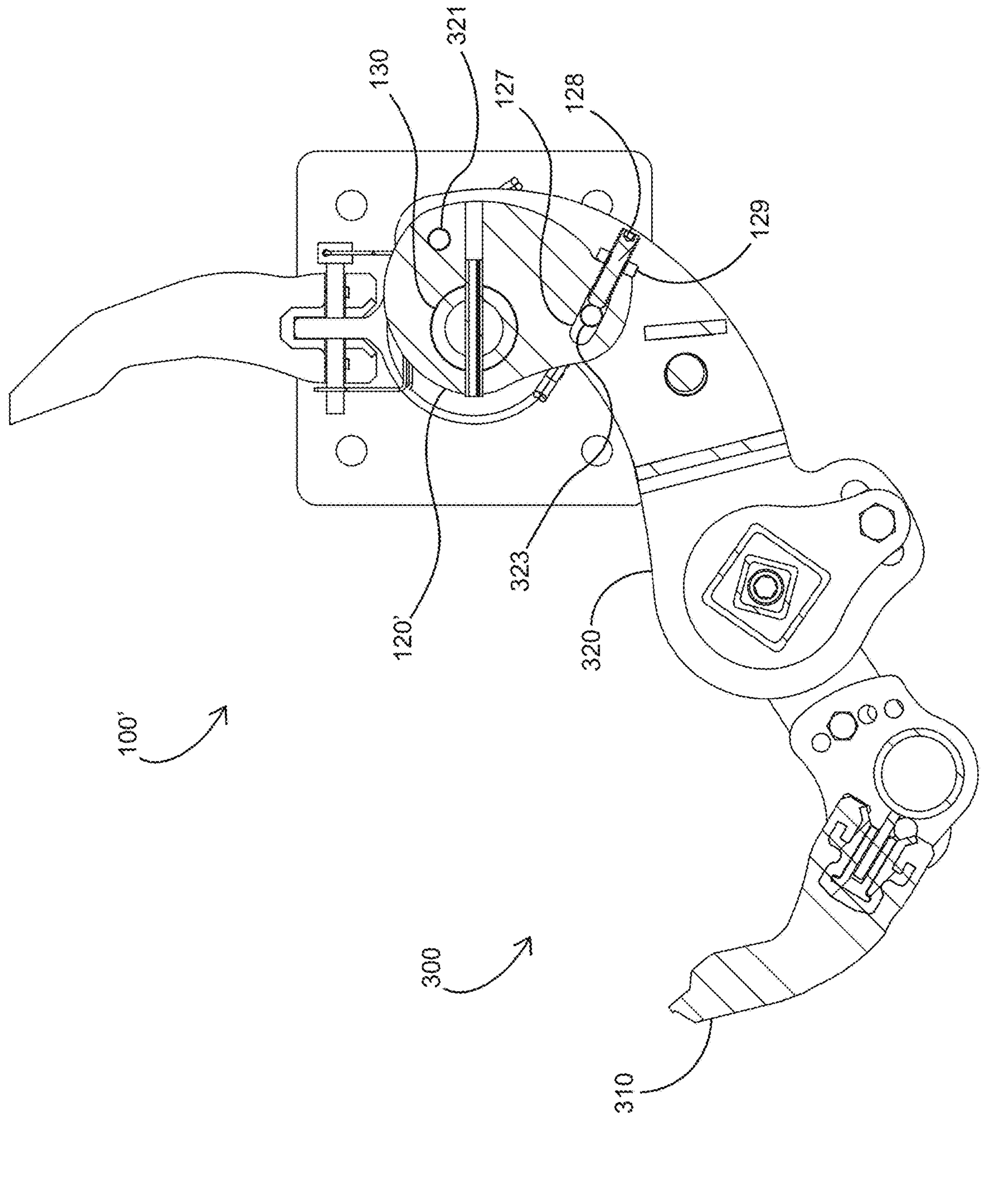
FIG. 9 is a cutaway view along section 9-9 of FIG. 8.

Referring to FIGS. 8 and 9, another embodiment of a conveyor scraper 100' is illustrated having modified arm mounts 120' (in some embodiments both arm mounts 120-1 and 120-2 are modified to the equivalent of the modified arm mount 120' as illustrated in FIG. 9). The modified arm mount 120' optionally comprises a slot 127 (e.g., at least partially threaded slot) configured to receive a set screw 128 (or bolt or other fastener). The set screw 128 can optionally be advanced in and out of the slot 127 by turning the set screw 128. A nut 129 optionally secures the position of set screw 128. Set screw 128 optionally contacts pin 323 at a first end of the set screw. The position of the first end of the set screw 128 optionally determines the angular position of bracket 320 relative to arm mount 120'. Thus, varying the position of set screw 128 in slot 127 optionally modifies the angular position of bracket 320 relative to arm mount 120' and thus modifies the position of blade 310. The slot 127 is optionally sized to permit the pin 323 to move within slot 127 for a plurality of positions of bracket 320 relative to arm mount 120'.

Although various embodiments have been described above, the details and features of the disclosed embodiments are not intended to be limiting, as many variations and modifications will be readily apparent to those of skill in the art. Accordingly, the scope of the present disclosure is intended to be interpreted broadly and to include all variations and modifications within the scope and spirit of the appended claims and their equivalents. For example, any feature described for one embodiment may be used in any other embodiment.

The invention claimed is:

1. A conveyor scraper, comprising:

a pole;

a primary scraper blade assembly at least partially supported on said pole, said primary scraper blade assembly comprising a first spring element;

a secondary scraper blade assembly, said secondary scraper blade assembly comprising a second spring element separate from said first spring element; and first and second arm mounts supported on said pole independently of said primary scraper blade assembly, wherein said secondary scraper blade assembly is supported on said first and second arm mounts.

2. The conveyor scraper of claim 1, wherein an angular position of said secondary scraper blade assembly is adjustable.

3. The conveyor scraper of claim 1, wherein said secondary scraper blade assembly is tension-adjustable.

4. The conveyor scraper of claim 3, wherein said primary scraper blade assembly is tension-adjustable.

5. The conveyor scraper of claim 1, wherein said first spring element comprises a coil spring.

6. The conveyor scraper of claim 5, wherein said second spring element comprises a torsional coupler, wherein said torsional coupler is not a coil spring.

7. The conveyor scraper of claim 1, wherein first spring element comprises a torsion spring arranged around said pole, wherein said primary scraper blade assembly further comprises:

a housing at least partially housing said torsion spring; and a blade supported on said housing.

8. The conveyor scraper of claim 7, further comprising:

first and second bearings pivotally supporting said housing on said pole, each of said first and second bearings being at least partially enclosed in said housing.

9. A conveyor scraper, comprising:

a pole configured to be supported on a conveyor; and a primary scraper blade assembly, the primary scraper blade assembly comprising:

a torsion spring arranged around said pole, said torsion spring applying a torque to a scraper blade supported on the primary scraper blade assembly, said torsion spring comprising a coil spring comprising multiple coils, said pole being radially within said coils, said torsion spring being at least partially supported on said pole; and a housing at least partially housing said torsion spring;

first and second arm mounts disposed on said pole and mounted independently of said primary scraper blade assembly, said first and second arm mounts configured to releasably support a secondary scraper blade assembly; and first and second bearings pivotally supporting said housing on said pole, each of said first and second bearings being at least partially enclosed in said housing.

10. A conveyor scraper, comprising:

a pole configured to be supported on a conveyor; and a primary scraper blade assembly, the primary scraper blade assembly comprising:

a torsion spring arranged around said pole, said torsion spring applying a torque to a scraper blade supported on the primary scraper blade assembly, said torsion spring comprising a coil spring comprising multiple coils, said pole being radially within said coils, said torsion spring being at least partially supported on said pole; and a housing at least partially housing said torsion spring;

first and second arm mounts disposed on said pole and mounted independently of said primary scraper blade assembly, said first and second arm mounts configured to releasably support a secondary scraper blade assembly; and first and second bearings pivotally supporting said housing on said pole, each of said first and second bearings being at least partially enclosed in said housing, wherein said housing comprises an internal stop, said internal stop being configured to stop said torsion spring from rotating in at least a first direction.

11. A method of installing a conveyor scraper assembly, comprising:

supporting a pole of a primary scraper assembly on a conveyor;

supporting said primary scraper assembly on said pole; and by arm mounts attached directly to said pole, installing a secondary scraper assembly on said pole; and at least partially enclosing each of said first and second bearings inside said housing.

* * * * *